United States Patent [19]

Nelson et al.

[11] Patent Number: 4,701,329

[45] Date of Patent: Oct. 20, 1987

[54] CALCIUM-FORTIFIED MILK

[75] Inventors: Catherine E. Nelson, Syracuse; Dennis E. Crowley, Adams, both of N.Y.; Wayne M. Weatherford, Spring, Tex.

[73] Assignee: Borden, Inc., Columbus, Ohio

[21] Appl. No.: 827,892

[22] Filed: Feb. 10, 1986

[51] Int. Cl.⁴ .................. A23C 9/154; A23C 9/158
[52] U.S. Cl. ............................... 426/74; 426/330.2; 426/547; 426/580
[58] Field of Search ............... 426/580, 586, 72, 547, 426/73, 575, 578, 74, 573, 576, 801, 330, 330.2

[56] References Cited

U.S. PATENT DOCUMENTS

| | | |
|---|---|---|
| 2,556,282 | 6/1951 | Le Gloabee . |
| 2,871,123 | 1/1959 | Bauer et al. . |
| 3,218,173 | 11/1965 | Loewenstein . |
| 3,494,916 | 2/1970 | Napper et al. . |
| 3,720,659 | 3/1973 | Guiseley et al. . |
| 4,351,735 | 9/1982 | Buddemeyer et al. . |
| 4,431,675 | 2/1984 | Schroeder et al. . |

FOREIGN PATENT DOCUMENTS 565028 10/1958 Canada .
1086530 8/1960 Fed. Rep. of Germany .
170165 10/1982 Japan .
31710 2/1984 Japan .

OTHER PUBLICATIONS

Copy of panel of a quart container for a product of Lehigh Valley Farms called ClaciMilk TM.
Copy of panel of a quart container for a product of Borden, Inc., called Dutch Chocolate Lowfat Milk.
Copy of side panels of a half gallon container for a product of Safeway Stores, Inc., called Vital 15 Milk TM.

Primary Examiner—Raymond N. Jones
Assistant Examiner—Marianne M. Cintins
Attorney, Agent, or Firm—Robbins & Laramie

[57] ABSTRACT

This invention relates to calcium-enriched and phosphorus-enriched fortified milk is characterized in perferred embodiments intended for beverage consumption by minimal settling of the calcium source, acceptable flavor, and acceptable viscosity and mouth-feel. The fortified milk may contain up to 100% of the U.S. R.D.A. of calcium in a one cup (8 ounce) serving of fortified whole milk. It is made by the addition of tri basic calcium phosphate, carrageenan and guar gum to fresh milk, effecting hydration of the gums, and assuring uniform distribution of the added materials in the milk.

39 Claims, No Drawings

CALCIUM-FORTIFIED MILK

BACKGROUND OF THE INVENTION

Nutritionists have stressed increasingly the need for calcium in the diet of men and woman of all ages as well as children. Recently, attention has been directed toward calcium and its role in preventing osteoporosis, the degenerative bone disease.

Niney-nine percent of the body's calcium is present in teeth and bones. Calcium is thus needed for both bone formation and maintenance. The other one percent circulates in the blood and is in part ionized. In its ionized form, calcium is of great importance in blood coagulation, in the function of the heart, muscles and nerves, and in the permeability of membranes. Calcium is also vitally important for normal nerve transmission, muscle contraction, heart function and blood clotting. If inadequate amounts of calcium reach the blood from dietary sources, calcium is removed from bones to make up the difference. Current scientific research shows evidence of calcium playing a part in protecting against high blood pressure and colon cancer.

An expert panel on bone health called together by the National Institute of Health summed it up with these words: "In some studies, high dietary calcium suppresses age-related bone loss and reduces the fracture rate in patients with osteoporosis". The U.S. Recommended Daily Allowance (R.D.A.) of calcium is 1000 mg. Many adult Americans are consuming lesser amounts of calcium. By increasing the amount of calcium in milk, it will be possible for people to more easily meet the U.S. R.D.A. for calcium. In addition, calcium is best absorbed when accompanied by vitamin D and lactose, both of which are found in milk.

Calcium-enriched food products and particularly calcium-enriched fresh milk have been developed and used from time to time in the past. However, until the development of the product and process of this invention, calcium-enriched fresh milks have had serious drawbacks. These milks have lacked stability and have had an off-taste. They have not tasted like good fresh milk. In addition, the source of calcium, usually an inorganic salt in finely divided form, has tended to settle out. This renders the calcium content non-uniform unless the milk is shaken, and forms a heavy sediment that may be difficult to re-suspend in the milk.

A canned calcium-enriched milk is described in the Bauer U.S. Pat. No. 2,871,123. Calcium carbonate was used as the calcium source and carrageenan gum for suspension. The product was a concentrated milk product which was diluted to make an infant formula.

A calcium-enriched fresh 1% butterfat milk presently sold under the trademark "CalciMilk" by Lehigh Valley Farms contains, according to the label, 66% more calcium than regular low fat milk. This product contains tricalcium phosphate to increase the calcium content, cellulose gel, and carrageenan. It also has lactase enzyme added to break down the lactose in milk. "Shake before serving" is printed on the carton, indicating that the tricalcium phosphate settles out.

The ability of different individuals to utilize the calcium in foods varies considerably. Generally, when an individual partakes of a high protein diet, about 15% of the dietary calcium is absorbed. When the individual partakes of a low protein diet, only about 5% of the dietary calcium is absorbed. Phytic acid in cereal grains interfers with calcium absorption by forming insoluble calcium phytate in the intestine. Oxalates in foods, such as spinach and rhubarb, may have a similar effect.

Other intestinal factors that influence the absorption of calcium include pH, since the more alkaline the contents of the intestines, the less soluble are the calcium salts; the calcium:phosphorus ratio, since a high ratio favors the formation of tricalcium phosphate rather than the more soluble, better absorbed forms; the presence of free fatty acids, which occurs when fat absorption is impaired; and the amount of vitamin D present, since vitamin D promotes the absorption of calcium from the intestine.

Phosphorus is found in every cell of the body, but like calcium, most of it is found in the bones and teeth. About 10% of the total phosphorus in the body is present in combination with proteins, lipids, and carbohydrates, and in other compounds in blood and muscle. Another 10% is widely distributed in a variety of chemical compounds. Phosphate ester is of great importance in energy transfer as is well known.

The metabolism of phosphorus is closely related to that of calcium. The calcium:phosphorus ratio in the diet affects the absorption and excretion of both of these elements. If either element is taken in excess, excretion of the other is increased. The optimal ratio is 1:1 when the intake of vitamin D is adequate.

Given all of this background information, it is apparent that the production of a shelf-stable, consumer-acceptable milk product fortified with added calcium and phosphorus would be an important contribution to human nutrition.

SUMMARY OF THE INVENTION

The word "milk" is used herein in a broad sense. It is used to refer to skimmed milk, lowfat milk, whole milk, filled milk, chocolate milk, and the like, whether in liquid or dried form. Unless specified as dry, however, the term "milk" in the specification refers to liquid milk. In the claims, where the context permits, the term "milk" denotes both liquid and dry milk. The term "milk product", as used herein and in the claims, encompasses products having a milk base, but fortified in accordance with the invention, and formulated with other materials for a specific purpose. That purpose may be human consumption, as would be the case with chocolate milk, but also could be for use in the enrichment with calcium, and preferably also with phosphorus, of baked goods, pet foods, puddings, yogurt, and other such foods where milk is often a component.

The present invention is concerned with a fortified milk product that provides added calcium and preferably added phosphorus in a suspension-stable, consumer-acceptable form. The product is formed by incorporating in milk, that contains some fat, a very finely divided, insoluble, edible, bland source of calcium, preferably tricalcium phosphate, together with a mixture of two hydrated gums that serve as stabilizing agents. These gums are carrageenan and guar gum. Preferably, vitamins are also present, particularly in low fat fortified milks, to enhance with nutritive value.

Kappa carrageenan is a preferred form of carrageenan gum. Generally the carrageenan is present in a slightly greater amount by weight than the guar gum, for optimum results. The presence of fat appears to enhance the action of the carrageenan, so that the amounts of the two gums selected for use may be adjusted in accordance with the fat content of the milk.

According to a preferred embodiment of the invention, the fortified milk is prepared by first forming a preblend of the dry particulate components, namely, the calcium fortifying agent, preferably tricalcium phosphate, carrageenan, and guar gum. To facilitate blending with the milk and the production of more uniform blends, a premix or master batch is formed by mixing the blended dry ingredients with an aliquot portion of the milk that is to be fortified. This mixture is continuously agitated for a period of time to permit the guar gum to hydrate. The premix is then added to the body of milk that is to be fortified, and agitation is continued to insure uniformity. The milk is then pasteurized, which permits the carrageenan to go into solution and to become hydrated. The milk may be homogenized if desired. It is then packaged and is ready for distribution and ultimate consumption.

The present invention differs from prior art calcium-enriched products because it makes possible the inclusion of insoluble calcium compounds in milk with minimal settling and without sacrificing acceptable flavor and mouth-feel. The fortified milk of this invention can be prepared to have acceptable taste; it can be made to taste like good fresh milk. An 8 ounce serving of whole milk, prepared according to the present invention, can be formulated to provide up to 100%, or even more, of the U.S. R.D.A. of calcium, and still retain good fresh milk flavor, and be characterized by good stability. In addition, the fortified milk of the invention can provide a good dietary source of phosphorus.

DETAILED DESCRIPTION OF THE INVENTION

According to this invention, the calcium content of milk is increased by blending into milk an edible, bland, insoluble calcium compound, such as calcium carbonate but preferably tricalcium phosphate, and certain gums that stabilize the mixture. It has been found that by the selection of the gums used, and the use of the proper proportions of two particular gums, the insoluble calcium compound not only remains well suspended in the milk but importantly permits a product to be prepared that can have the flavor, taste, and mouth-feel of good fresh cow's milk.

The edible, bland, insoluble calcium compound used for fortification preferably should be finely divided tricalcium phosphate. Other sources of calcium have been evaluated and most have been found wanting for a variety of reasons. For example, calcium citrate and calcium glycerophosphate all have been evaluated and found wanting in one or more respects. Calcium chloride is too bitter. Finely divided tricalcium phosphate and calcium carbonate are each edible, bland, insoluble, and in fine particles sizes are readily formed into suspensions that are acceptably shelf-stable. Tricalcium phosphate enriches the milk with phosphorus, although calcium carbonate, while useful, does not.

The tricalcium phosphate or calcium carbonate preferably is sufficiently finely divided to satisfy a specification of 99% through a 325 mesh U.S. Standard Sieve screen. This means that the maximum particle diameter is not substantially above about 44 micrometers. The term "diameter" is used here in its usual sense when referring to fine particles, to mean the largest dimension, and it does not connote a spherical particle shape. While particles having a maximum diameter not substantially above about 44 micrometers are preferred, somewhat larger particles sizes can be used with acceptable results, although larger particles tend toward less stability. Screening the 44 micrometer product, meeting a specification of 99% through a 325 mesh U.S. Standard Sieve, produces a more uniform batch of particles in size, but does not affect suspension stability. Similarly, even smaller particles than those preferred offer no advantage as to stability of suspension, while generally increasing costs, since the finer sizes are usually more expensive.

A combination of two stabilizing agents has been found to produce acceptable shelf stability. The two agents are carrageenan and guar gum, used in specific amounts, with the amount of carrageenan usually being in slightly greater amount by weight than the amount of guar gum. These particular gums were selected after evaluating many stabilizing agents. These gums were selected for their ability to suspend tricalcium phosphate, as well as the other calcium salts that were evaluated, without affecting flavor in a material way. In addition, the particular combination of gums appears to cause the smallest change in the viscosity of the milk selected for fortification.

The preferred carrageenan gums for use are the kappa carrageenans, the most preferred being a product of Marine Colloids sold under the trademark "SEAKEM 315". The most preferred grade of guar gum is a product of Dycol, Inc. sold under the trademark "DYCOL 4500 F GUAR GUM". The selected carrageenan and guar gums must be used in combination. Neither gum works satisfactorily alone.

Commercial carrageenan gum has a molecular weight in the range from 100,000 to 1,000,000, generally. It is not soluble in milk at 20° C. but is at about 80° C. It is available as a powder that ranges in color from white to beige, depending upon the grade. It is a linear polysaccharide made up of repeating galactose units and 3,6 anhydrogalactose (3,6.AG), both sulfated and nonsulfated, joined by alternating alpha 1-3, beta 1-4 glycosidic linkages.

The three types of carrageenan that are in common use and commercially available are known as kappa, iota, and lambda. The primary differences that influence the properties of the three types of carrageenan are the number and position of the ester sulfate groups on the repeating galactose units.

The preferred carrageenan gums for use in the practice of the present invention are the kappa carrageenans, and are believed to carry a maximum (average) of a single sulfate substituent group per pair of adjacent rings. The kappa carrageenans generally are approximately 25% ester sulfate and approximately 34% 3,6-AG.

At certain locations on the surface areas of the casein micelle, there is a very strong concentration of positive charges. These positive charges react strongly with the negative charges on the carrageenan. This reaction, in combination with the double helices that tend to occur in aqueous systems, increases the gel strength substantially. It is for this reason that the cocoa in chocolate milk can be suspended with a very small amount of carrageenan, such as, for example, 0.03% by weight. This may also contribute to the success of the systems described in this application.

Guar gum comprises a straight chain of D-mannose with a D-galactose side chain on approximately every other mannose unit; the ratio of mannose to galactose is 2:1. Guar gum has a molecular weight on the order of 220,000.

Guar gum hydrates in either cold or hot milk to give high-viscosity solutions at low concentrations. Although the viscosity development depends on particular size, pH, and temperature, guar gum at 1% concentration fully hydrates typically within 24 hours at room temperature and in 10 minutes at 80° C., to give viscosities of 3-6 Pa.s (30-60 P), depending upon the grade. Guar gum solutions are stable over the pH range of 4.0-10.5 with fastest hydration occurring at pH 8.0.

Guar gum is compatible with other common plant gums, including the carrageenans. It has useful emulsifying properties. It hydrates rapidly, which is an advantage in the present invention.

The most preferred embodiment of the invention is a fortified whole milk, that provides 100% of the U.S. R.D.A. for calcium in a single 8 ounce serving, and that has excellent stability. The amount of added tricalcium phosphate required to provide 100% of the U.S. R.D.A. for calcium in an 8 ounce serving is about 0.85% by weight of the milk. There is no harm in exceeding 100%, so preferably a 0.9% or even a 1.0% addition is used, which will compensate for any fluctuation in the natural calcium composition of the milk. The process that is used in preparing fortified milks in accordance with the present invention can be illustrated by describing the way in which this preferred fortified whole milk is produced.

First, about 0.9% by weight of tricalcium phosphate is dry blended with 0.031% to 0.039% of SeaKem 315 kappa carrageenan gum and 0.023% to 0.029% guar gum, all percentages being by weight based on the weight of the milk to be enriched. These dry particulate materials are thoroughly blended together, then introduced into an aliquot of the milk. The dry materials and the aliquot of milk are thoroughly mixed together, preferably in a liquefier. Sufficient time is taken to insure substantially complete hydration of the guar gum. The premix is then added to the main residual body of the milk, and the milk is then stirred or agitated to secure a substantially uniform mixture. Generally about 15 minutes of mixing in the liquefier is necessary for hydration of the guar gum to be accomplished and for uniform suspension of the tricalcium phosphate to be made.

The enriched milk is then processed through a pasteurization sequence, at a temperature of about 80° C. (175° F.). This insures solubilization and hydration of the carrageenan. The milk may be homogenized if desired. Since homogenization disperses the fat uniformly and usually breaks up the fat into globules of very small size, the sizes being reasonably uniform, homogenization is generally preferred with whole milk at least, but it is optional. The milk is then packaged and is ready for any necessary storage, and for distribution to the ultimate consumer.

Some fat, preferably butterfat, should be present in the milk for the practice of the invention. The presence of butterfat appears to help the carrageenan perform its stabilization task. Butterfat contents as low as 1% have been used effectively. Generally, as the amount of butterfat is decreased below a value that is generally considered to be standard, that is, 3.25% by weight, the amount of tricalcium phosphate that may be present in the fortified milk, while retaining good suspension-stability, drops off. The invention is therefore not considered applicable to skimmed milk containing essentially no residual butterfat. In preferred embodiments of the invention, the milk contains at least 2% by weight butterfat, and for an enriched (fortified) whole milk, the butterfat content should be at least 3.25%.

To enrich a low fat milk containing about 2% butterfat, for example, the production process is the same as that for the enrichment of whole milk, except for the amount of the tricalcium phosphate employed.

Thus, for making fortified whole milk in accordance with the preferred embodiment of the invention, the amounts employed are: tricalcium phosphate, 0.26%-1.0%; kappa carrageenan, preferably SeaKem 315, 0.01%-0.06%; and guar gum, 0.01%-0.06%; all of these percentages being by weight based on the weight of the milk. For a fortified 2% fat milk product, the proportions employed are: tricalcium phosphate, 0.26%-0.5%; kappa carrageenan, 0.01%-0.06%; and guar gum, 0.01%-0.06%; all of these percentages being by weight based on the weight of the milk.

For products where fortification is the primary objective and suspension-stability is more important to achieve than flavor and mouth-feel, broad ranges of gum percentages are useful. The amounts and proportions of the gums used generally must be selected after some experimentation, since they will depend upon the equipment and temperatures used, mixing times, efficiency of mixing, and other such variables. Thus the amounts and proportions that produce optimum results in the laboratory will not necessarily do so in the plant. Good suspension-stability for beverage use can often be attained when the amount of carrageenan is 0.03%-0.04%, and the amount of guar gum is 0.02%-0.03%, both percentage ranges being by weight based on the weight of the milk.

To satisfy demanding consumers of fortified milk that is consumed as a beverage, flavor and mouth-feel are important. Optimum properties are achieved when the carrageenan gum is at 0.031% to 0.039%, and the guar gum is at 0.023% to 0.029%. In the laboratory, optimum palatability and acceptance have been achieved when the amount of carrageenan was 0.033% and guar gum, 0.025%. However, in one plant, the optimums have been achieved when the carrageenan was at 0.035% and the guar gum at 0.0275%.

For a calcium-fortified and phosphorus-fortified whole milk product made in accordance with the most preferred embodiment of the present invention, for optimum palatability, and providing 100% of the calcium U.S. R.D.A. per 8 ounce portion, the percentages by weight of the fortified whole milk, of the several respective ingredients, thus are as follows: tricalcium phosphate, 0.9%; SeaKem 315 carrageenan, 0.031%-0.039%; and guar gum, 0.023-0.029%. Similarly, for a calcium-fortified and phosphorus-fortified low fat milk containing about 2% butterfat, the percentages by weight of the several respective ingredients employed in this most preferred embodiment of the invention to provide 70% of the calcium U.S. R.D.A. per 8 ounce portion, are tricalcium phosphate, 0.5%, and kappa carrageenan and guar gum at the same values as for whole milk.

Suspension-stability is determined in a particular way, and references in this application to good suspension-stability should be understood as meaning that the suspension-stability has been determined in this particular way. Initially, after a fortified milk product has been freshly produced and packaged, samples are taken from the top and from the bottom of the container. The container is then shaken, and a single sample is taken from any location; this is adequate if the shaking has been thorough. The calcium contents of these samples are then determined by atomic absorption spectra testing. This procedure is then repeated at 6 day intervals. Since a maximum of 12 days is considered comparable to the maximum shelf life or dairy case life that is expected of fresh milk, samples are taken on the 6th day and on the 12th day after the fortified milk product has been made and packaged. On a scale of 1000, a deviation in calcium content of plus or minus 10 units is the criterion applied to determine whether suspension-stability is adequate. If the deviation between the samples is less than 10 units, the stability is considered satisfactory. If the deviation is more than 10 units, the product is considered to be unstable.

Fortified milk products made in accordance with preferred embodiments of the present invention exhibit acceptable stability after 12 days of refrigerator storage, that is, at a temperature of 38° F. to about 40° F. The samples are taken for stability determinations at refrigerator temperature. In commercial practice, as a check on commercial production runs, samples will be taken as made, half way through the 12 day period, and on the 12th day.

The particular sampling procedure described is important because it reflects any sedimentation that may occur. From very substantial experimental work, it appears that with the preferred systems of the invention, any sedimentation that may occur can be attributed to poor mixing and poor hydration during the production process.

The viscosity of the fortified milk is an important factor in taste and mouth-feel. Viscosity is determined by a modified Zahn test. This uses a cup with a fixed orifice, through which a predetermined amount of milk is permitted to flow. The number of seconds taken for complete flow is reported as a measure of the viscosity. The original Zahn test passes 50 milliliters of sample through a 0.125 inch orifice. The modified Zahn test used in accordance with the present invention passes a sample of 150 milliliters through an orifice having a diameter of 0.081 inches. With the particular equipment used in making viscosity determinations by the inventors, the height of the sample column, with a sample size of 150 milliliters of milk or fortified milk, was 6.25 inches. Measurements were made at refrigerated temperatures, that is, 38°-40° F.

The invention will be further illustrated by several specific examples, which are intended to be illustrative rather than limiting. All parts and percentages are by weight, and all temperatures are °F., unless specifically stated to be otherwise. All of the tricalcium phosphate employed, unless otherwise stated, was 99% through a 325 mesh Sieve (U.S. Standard).

EXAMPLE 1

Calcium Fortification and Phosphorus Fortification of Milks Having Different Butterfat Contents

TABLE 1

| Calcium added to these percentages of U.S. R.D.A.: | 50 | 66 | 75 | 100 |
|---|---|---|---|---|
| Formulation No. | 1-1 | 1-2 | 1-3 | 1-4 |
| milk | 99.73 | 99.49 | 99.5 | 99.1 |
| tricalcium phosphate | 0.27 | 0.45 | 0.55 | 0.85 |
| guar gum | 0.03 | 0.03 | 0.03 | 0.026 |
| carrageenan | 0.03 | 0.03 | 0.03 | 0.026 |

Each of the formulations reported in Table 1 above was used to fortify each of several different batches of milk, at different butterfat contents, namely, 1% butterfat, 2%, 3.5%, and 5%. Thorough mixing of each formulation was carried out for a sufficient period of time to insure uniformity and substantially complete hydration of the gums.

Preliminary consumer evaluations of these several fortified milk products, consumed as beverages, led to the selection for further evaluation of the 2% butterfat milk fortified to 66% calcium U.S. R.D.A., and 3.5% butterfat milk fortified to 100% calcium U.S. R.D.A.

These particular runs were therefore replicated to confirm observations. To make the fortified 2% butterfat milk, the finely divided particulate tricalcium phosphate was added in the following amounts, to the two different batches: 263 mg/100 grams of milk, and 264 mg/100 grams of milk. For the 3.5% butterfat milk, the following amounts of tricalcium phosphate were added to the two different milk batches: 385 mg/100 grams of milk, and 390 mg/100 grams of milk.

EXAMPLE 2

Milk Standarized to 3.25% Butterfat Content, Fortified with Calcium Carbonate

A 40 pound batch of milk standarized to a butterfat content of 3.25% by weight was modified by the addition of the following ingredients:

| Ingredient | Weight Added | Weight Perentage |
|---|---|---|
| Calcium Carbonate | 186.14 grams | 1.025 |
| SeaKem 315 kappa carrageenan | 5.99 grams | 0.033 |
| Guar Gum | 4.54 grams | 0.025 |

After thorough blending to insure uniformity and over sufficient time to achieve substantially complete hydration of the gums, the fortified milk was pasteurized at 175° F. and homogenized at at 2000 psi. Stability was acceptable.

When calcium citrate was used in place of calcium carbonate, the stability was poor and the pasteurizing equipment plugged up. The milk that came through the pasteurizing equipment was discolored. The product was sandy in texture.

When calcium glycerophosphate was employed in place of calcium carbonate, there was substantial foam produced during mixing, clumps tended to form on top of the milk, the pasteurizing equipment plugged up, and the product exhibited substantial settling or sedimentation of the calcium salt.

With both of these other calcium salts that were substituted for the calcium carbonate, the percentages, by weight of the milk, of the carrageenan and guar gum employed were the same, although the amounts of salt were adjusted to provide a constant fortification with calcium.

EXAMPLE 3

Fortification of Low Fat Milk Containing 2% by weight Butterfat

Several runs were again made using 40 pound batches of 2% butterfat milk. After uniformity of the fortified milk had been achieved by mixing, and after substantially complete hydration of the gums, the several batches of milk were pasteurized at 175° F. and homogenized at 2000 psi.

The following formulations were evaluated:

TABLE 2

| | Ingredients | | | | | |
|---|---|---|---|---|---|---|
| | Tricalcium Phosphate | | SeaKem 315 Kappa Carrageenan | | Guar Gum | |
| Run | wt., g | % by wt. | wt., g | % by wt. | wt., g | % by wt. |
| 3-1 | 90.8 | 0.5 | 5.99 | 0.033 | 4.54 | 0.025 |
| 3-2 | 90.8 | 0.5 | 5.99 | 0.033 | 4.90 | 0.027 |
| 3-3 | 90.8 | 0.5 | 5.99 | 0.033 | — | — |
| 3-4 | 90.8 | 0.5 | 5.99 | 0.033 | 2.99 | 0.0165 |
| 3-5 | 145.28* | 0.80* | 5.99 | 0.033 | 4.54 | 0.025 |

*CaCo₃ used rather than tricalcium phosphate.

Runs 3-1, 3-2, 3-3 and 3-4, four days after the pasteurized and homogenized milks had been packaged, were evaluated for sedimentation. None had produced any discernible sediment.

Run 3-5 employed calcium carbonate in finely divided form as the fortifying agent. Four days after packaging, the milk exhibited slight sedimentation. Six days after packaging, the flavor remained satisfactory.

When Run 3-5 was rerun using whole milk and substituting for the calcium carbonate 163.44 grams of tricalcium phosphate (0.90%), the premix was foamy upon addition to the main batch of milk for mixing.

EXAMPLE 4

Viscosity Observations

Milk standardized to 3.25% butterfat content was fortified in 40 pound batches, as reported in Table 3 below. The fortified milk was pasteurized at 175° F. and homogenized in a single stage at 2000 psi.

TABLE 3

| Run | Carrageenan Used | Amount Used, Weight % | Amount Guar Gum Used, Wt. % | Unshaken Viscosity Measurements, Seconds | | Other Comments |
|---|---|---|---|---|---|---|
| | | | | First | Second | |
| 4-1 | Seakem 912 Kappa | 0.03 | 0.03 | 62.4 | 64.4 | no visible sediment |
| 4-2 | Seakem 611 Kappa | 0.02 | 0.03 | 45.2 | 48.2 | some sediment |
| 4-3 | Seakem 611 Kappa | 0.025 | 0.03 | 57.4 | 57.4 | no visible sediment |
| 4-4 | Seakem 611 Kappa | 0.035 | 0.02 | 71.2 | 70.1 | no visible sediment |
| 4-5 | none | — | 0.03 | 41.6 | 41.2 | lots of sediment |
| 4-6 | Seakem 315 Kappa | 0.035 | 0.02 | 57.7 | 57.9 | slight sediment |
| 4-7 | Seakem 315 Kappa | 0.03 | 0.03 | 56.4 | 55.4 | no visible sediment |
| Control (no additions) | | — | — | 36.2 | 36.1 | — |

The viscosity observations were made on the milk batches one day after packaging, as were the observations as to sediment. Generally, the flavor of all batches, including the control batch, was acceptable. However, Run 4-6 had an off flavor and a dry sort of taste.

EXAMPLE 5

Viscosity Determinations on Whole Milk at 80% R.D.A. of Calcium and at 90% R.D.A. per 8 ounce serving.

Several 40 pound batches of milk, standardized at 3.25% butterfat content, were fortified with tricalcium phosphate. After formulating the several different batches of milk, each was pasteurized at 175° F. and homogenized in a single stage at 2000 psi. The formulations that were made up and evaluated are summarized below in Table 4.

TABLE 4

| | | Percentages by Weight | | | | | |
|---|---|---|---|---|---|---|---|
| Run | % R.D.A. per 8 oz. | Tricalcium Phosphate | Carrageenan | | Guar | Viscosity Readings, Secs. | Flavor |
| 5-1 | 80 | 0.61 | SeaKem 611 | 0.02 | 0.03 | 49.9  49.9 | acceptable |
| 5-2 | 80 | 0.61 | SeaKem 611 | 0.025 | 0.03 | 55.2  53.4 | acceptable |
| 5-3 | 80 | 0.61 | SeaKem 315 | 0.035 | 0.02 | 55.1  57.4 | acceptable |
| 5-4 | 80 | 0.61 | SeaKem 611 | 0.027 | 0.02 | 54.3  54.4 | good |
| 5-5 | 80 | 0.61 | SeaKem 615 | 0.03 | 0.025 | 52.7  52.8 | good |
| 5-6 | 90 | 0.76 | SeaKem 315 | 0.03 | 0.03 | 55.6  55.2 | good |
| 5-7 | 90 | 0.76 | SeaKem 315 | | 0.02 | 58.6  57.5 | good |
| 5-8 | 90 | 0.76 | SeaKem 315 | 0.03 | 0.03 | 55.6  55.2 | good |
| Control | 30 | none | none | | none | 37.4  36.6 | good |

The viscosity determinations reflect the additions that have been made to the milk and are an indicator of mouth-feel. While it is a subjective matter, the most acceptable products seem to be those having a viscosity of about 50 seconds and generally in the range 45-60 seconds, as in the Table above.

When a somewhat similar set of experiments was run with 40 pound batches of milk standardized at 2% butterfat content, and fortified with tricalcium phosphate to 70% U.S. R.D.A., using SeaKem 315 kappa carrageenan in amounts in the range from 0.3% to 0.36%, and guar gum in amounts in the range from 0.2% to about 0.3%, the viscosities generally were in the range from about 45 seconds to 60 seconds, with the higher viscosities being observed as increasing amounts of the stabilizers were used. In all cases, the flavors were acceptable.

The precise formulations evaluated are reported below in Table 5.

TABLE 5

Observations on 2% Milks Fortified to 70% R.D.A. of Calcium

| Run | Percentage by Weight | | Viscosities, Seconds | | Flavor and Mouth-Feel |
|---|---|---|---|---|---|
| | SeaKem 315 Carrageenan | Guar | | | |
| 5-9 | 0.03 | 0.03 | 50.2 | 49.2 | acceptable |
| 5-10 | 0.036 | 0.02 | 53.4 | 52.8 | acceptable |
| 5-11 | 0.033 | 0.02 | 50.0 | 50.0 | acceptable |
| 5-12 | 0.036 | 0.036 | 60.9 | 59.6 | acceptable, thick |
| 5-13 | 0.03 | 0.02 | 54.9 | 54.9 | acceptable, slightly thick |
| 5-14 | 0.033 | 0.02 | 58.4 | 58.4 | acceptable |
| 5-15 | 0.033 | 0.02 | 48.8 | 49.1 | good |
| 5-16 | 0.033 | 0.033 | 55.1 | 54.9 | good; slightly heavy body |
| 5-17 | 0.033 | 0.025 | 50.0 | 50.0 | good |
| Control | — | — | 36.4 | 36.8 | acceptable |

In each of these Runs, the percentage by weight of tricalcium phosphate added was 0.5%, to obtain fortification at the 70% R.D.A. level. For the most acceptable texture, mouth-feel, and flavor, those Runs having viscosities below 55 were preferred. Run 5-11 respresents close to an optimum product at the 2% butterfat content level. This finding was confirmed by Run 5-15, which was essentially a replication of Run 5-11.

Similar evaluations made on milk batches standardized at 3.25% butterfat, fortified to the level of 100% R.D.A. calcium per 8 ounce serving, indicated that the stabilizer levels of SeaKem 315 at 0.033% and guar gum at 0.01% to 0.02% appeared to be optimum, with excellent stability and viscosity levels in a range of 50-55 seconds, and with good flavor and mouth-feel.

All of the foregoing evaluations were made after the batches had been fortified, pasteurized at 175° F., and homogenized in a single stage at 2000 psi.

CONCLUSION

This invention has been primarily addressed to the development of a highly saleable, consumer-acceptable product. With any calcium enriched product, the consumer often knows at the first taste that the milk being consumed has been modified in some way. That is probably because the increase in viscosity that accompanies fortification leads to a different mouth-feel. The evaluations made in developing the present invention indicate that fortified products having viscosities of 45-60 seconds generally are acceptable; that viscosities of 48-55 are preferred; and that a viscosity of about 50 is most preferred. The consumer still detects a difference, but the difference is palatable in these viscosity ranges.

With a calcium-fortified milk, the purchasing consumer can be expected to make the initial purchase because of the calcium fortification, and to repeat purchases only if the milk product is attractive for consumption. However, this invention has led to the production of a family of calcium-fortified, and calcium-fortified and phosphorus-fortified milk products, that are useful for a variety of purposes in addition to direct consumption as a beverage, where the demanding properties required for direct beverage consumption need not be present. For example, calcium-fortified milks are useful in the production of puddings, baked goods, and pet foods. Calcium-fortified milks are also useful for providing the liquid component for such things as pancakes, meatloaf, and cream soups. In all of these applications, taste and mouth-feel are of secondary importance to suspension-stability and the fact that added nutrients are being supplied. For such applications, the stabilizing systems of this invention offer a valuable means of producing fortified milks of good suspension-stability. By adjustment of these stabilizing agents and their concentrations within the ranges described, fortified milks can be produced that are quite acceptable and that require little or no mixing or shaking prior to use. These are important considerations to industrial consumers such as bakeries, where thick sediments in equipment are highly undesirable.

Tricalcium phosphate in extremely finely divided form is a preferred fortifying agent. However, calcium carbonate is also useful where only calcium fortification is needed. Tricalcium phosphate has the advantage of offering a high calcium content per unit weight and of providing fortification with phosphorus in addition to calcium.

The combination of kappa carrageenan and guar gum produces stabilized fortified milks of exceptionally suitable properties for use in human food products as well as in animal food products. While kappa carrageenan is preferred, it may be used in combination with iota carrageenan, with lambda carrageenan, and with mixtures of these two other carrageenan gums, all three of which are commercially available.

The Marine Colloids division of FMC offers a line of carrageenan gums that are identified by a combination of trade names and numbers. For use with milk, the manufacturer suggests the SeaGel, SeaKem, and Lactarin carrageenan gums. The SeaGel gums are recommended for gelation, the SeaKem gums where added viscosity is desired, and the Lactarin gums where cold solubility is important. The SeaKem gums have been found to be particularly desirable for use in the present invention. The numbers that are usually associated with each gum appear in sets of three, such as, for example, in the preferred kappa carrageenan gum, SeaKem 315. The first numeral in the set of three numerals refers to effect on gel strength, the higher numbers on the scale 0-9 indicating higher gel strength. The second numeral in the set of three numerals refers to gel texture, on a scale of 1 to 9. Lower value numerals indicate brittle gels, and higher numerals indicate elastic gels. This second numeral has little meaning in the context of the present invention, since gels are not formed. The third numeral is a milk protein reactivity index, the higher numbers on a scale of 1 through 9 reflecting higher reactivity.

The calcium fortification agent should be bland in taste, especially when present in the milk. It should be very finely divided, preferably having its largest particle size about 44 micrometers or less, that is, having 99% of its particles passed through a 325 mesh U.S. standard Sieve screen. It should be insoluble, since the reaction of carrageenan with proteins is mediated by the presence of calcium cations. These cations act as a bridge or alter the charge characteristics of the participating species. Thus the presence of calcium cations from the added fortification agent is to be avoided.

While the invention has been disclosed in this patent application by reference to the details of preferred embodiments of the invention, it is to be understood that this disclosure is intended in an illustrative rather than in a limiting sense, as it is contemplated that modifications will readily occur to those skilled in the art, within the spirit of the invention and the scope of the appended claims.

What is claimed is:

1. A calcium-fortified milk product providing about 500 mg–1000 mg of calcium per 8 ounce serving comprising liquid milk containing not less than 1% butterfat, an added edible, bland, water-insoluble calcium compound in finely divided form distributed therein, and 0.01%–0.06% of carrageenan gum and 0.01%–0.06% of guar gum each in hydrated form and uniformly distributed throughout the liquid milk as stabilizers, said percentages being by weight based on the weight of the fluid milk, the amounts and proportions of said gums being sufficient to render said calcium-fortified milk substantially suspension-stable.

2. The fortified milk product of claim 1 wherein said calcium compound is selected from the group of salts consisting of calcium carbonate and a calcium phosphate.

3. The fortified milk product of claim 2 wherein said milk contains at least 2% fat, the carrageenan gum is a kappa carrageenan, and the amount of calcium salt is such that an 8 ounce serving of the fortified milk provides at least 60% of the U.S. R.D.A. of calcium.

4. A calcium-fortified and phosphorus-fortified liquid milk product providing about 500 mg–1000 mg of calcium per 8 ounce serving comprising milk containing not less than 1% butterfat, an added edible, bland, water-insoluble calcium salt of a phosphorus-containing acid in finely divided particulate form distributed therein, and 0.01%–0.06% of carrageenan gum and 0.01%–0.06% of guar gum each in hydrated form and uniformly distributed throughout the milk as stabilizers, said percentages being by weight based on the weight of the liquid milk, the amounts and proportions of said gums being sufficient to render said fortified milk substantially suspension-stable.

5. The fortified milk product of claim 4 in which said calcium salt is tricalcium phosphate.

6. The fortified milk product of claim 5 in which said milk is whole milk.

7. The fortified milk product of claim 5 in which said milk is partially defatted milk.

8. A calcium-fortified and phosphorus-fortified liquid milk, product providing about 500 mg–1000 mg of calcium per 8 ounce serving comprising:
liquid milk containing not less than 1% butterfat;
0.26%–1.0% by weight based on the weight of the liquid milk of tricalcium phosphate in finely divided form distributed throughout the milk; and
0.01%–0.06% by weight based on the weight of said liquid milk of carrageenan and 0.01%–0.06% by weight based on the weight of said liquid milk of guar gum, said gums being in hydrated form and distributed uniformly throughout the milk the amounts and proportions of said gums being sufficient to render said fortified milk substantially suspension-stable.

9. The fortified milk of claim 8 wherein said milk contains at least 1% by weight of butterfat.

10. The fortified milk of claim 9 wherein said carrageenan is a kappa carrageenan.

11. The fortified milk of claim 10 wherein said carrageenan is present in an amount by weight that is at least 25% greater than the amount of said guar gum.

12. The fortified milk of claim 11 wherein said tricalcium phosphate particles have maximum diameters predominantly not in excess of 44 micrometers.

13. The fortified milk of claim 12 wherein the butterfat content of said milk is at least 3.25% by weight of said milk.

14. The fortified milk of claim 10 wherein the amount of tricalcium phosphate present is sufficient that an 8 ounce serving of said fortified milk provides 100% of the U.S. Recommended Daily Allowance for calcium.

15. A calcium-fortified and phosphorus-fortified liquid milk product providing about 500 mg–1000 mg of calcium per 8 ounce serving comprising:
low fat liquid milk containing not less than 1% butterfat;
0.26% to 0.5% by weight based on the weight of said fluid milk of tricalcium phosphate in finely divided form, wherein said tricalcium phosphate particles have maximum diameters of predominantly not in excess of 44 micrometers distributed throughout the milk; and
0.01%–0.06% by weight based on the weight of the liquid milk of a kappa carrageenan and 0.01%–0.06% by weight based on the weight of the milk of guar gum, said gums being distributed uniformly throughout the milk in hydrated form, the amounts and proportions of said gums being sufficient to render said fortified milk substantially suspension-stable.

16. The fortified milk product of claim 15 wherein said milk contains at least 2% by weight of butterfat.

17. The fortified milk product of claim 16 wherein said carrageenan is present in an amount by weight that is at least 20% greater than the amount of said guar gum.

18. The fortified milk product of claim 17 wherein the amount of tricalcium phosphate present is sufficient that an 8 ounce serving of said fortified milk product provides at least 60% of the U.S. Recommended Daily Allowance for calcium.

19. The fortified milk product of claim 16 comprising 0.03%–0.04% by weight based on the weight of said milk of said kappa carrageenan and 0.02%–0.03% by weight based on the weight of said milk of guar gum.

20. The fortified milk product of claim 17 wherein said milk contains about 2% butterfat by weight, the amount of tricalcium phosphate present is sufficient than an 8 ounce serving of said fortified milk product provides at least 60% of the U.S. Recommended Daily Allowance for calcium, the amount of carrageenan is in the range 0.031% to 0.039%, and the amount of guar gum is in the range 0.023% to 0.029%.

21. The fortified milk product of claim 20 wherein the amount of carrageenan is 0.035% and the amount of carrageenan is 0.035% and the amount of guar gum is 0.0275%.

22. The fortified milk product of claim 19 that has a viscosity of 45 seconds to 60 seconds as measured by a modified Zahn test wherein the time required for a 150 ml. column of said milk to flow through an orifice having a diameter of 0.081" and an initial column height of 6.25", determined at 38°–40° F., is measured in seconds.

23. A calcium-fortified and phosphorus-fortified whole milk containing about 100% of the U.S. Recommended Daily Allowance of calcium in an 8 ounce serving comprising 0.85% to 1% by weight based on the weight of whole milk of tricalcium phosphate in finely divided form, having particles sizes that are predominantly not substantially in excess of 45 micrometers, distributed throughout the milk; and about 0.03%–0.04% by weight based on the weight of said whole milk of a kappa carrageenan and about 0.02%–0.03% by weight based on the weight of said whole milk of guar gum, said gums being in hydrated form and distributed throughout the milk, the amounts and proportions of said gums being sufficient if fully hydrated and uniformly distributed to render said fortified milk substantially suspension-stable.

24. The fortified milk of claim 23 that has a viscosity of 45 seconds to 60 seconds as measured by a modified Zahn test wherein the time required for a 150 ml. column of said milk to flow through an orifice having a diameter of 0.081" and an initial column height of 6.25", determined at 38°–40° F., is measured in seconds.

25. A process for making a calcium-fortified fluid milk providing about 500 mg–1000 mg of calcium per 8 ounce serving comprising the steps of
(1) adding to and mixing with liquid milk containing not less than 1% butterfat: an edible, bland, water-soluble calcium compound in finely divided form; 0.01%–0.06% of carrageenan gum and 0.01%–0.06% of guar gum under conditions such that the gums are hydrated, the amounts and proportions of said gums being sufficient to render said fortified milk substantially suspension-stable and so that said calcium compound, said carrageenan gum and said guar gum are distributed uniformly throughout the milk, said percentages being by weight based on the weight of the milk, and
(2) packaging the fortified milk.

26. The process of claim 25 comprising pasteurizing the milk.

27. The process of claim 25 wherein said carrageenan is a kappa carrageenan.

28. A process for making a calcium-fortified and phosphorus-fortified milk providing about 500 mg–1000 mg of calcium per 8 ounce serving comprising the steps of
(1) mixing 0.26%–1.0% edible, finely divided, insoluble tricalcium phosphate, 0.01%–0.06% carrageenan, and 0.01%–0.06% guar gum with fluid milk that contains not less than 1% butterfat, and mixing said materials under conditions such that said guar gum is hydrated,
(2) pasteurizing, and thereby hydrating said carrageenan gum, the amounts and proportions of said gums which are uniformly distributed throughout being sufficient to render said fortified liquid milk substantially suspension-stable,
(3) homogenizing, and then
(4) packaging the fortified milk.

29. The process of claim 28 in which said tricalcium phosphate has particle sizes not substantially in excess of 44 micrometers.

30. The process of claim 28 wherein said carrageenan is a kappa carrageenan.

31. The process of claim 30 wherein said finely divided tricalcium phosphate, carrageenan, and guar gum are preblended together in powder form, then blended into a small amount of said milk to form a premix, and then said premix is blended into said milk.

32. The process of claim 31 wherein said milk contains at least 2% by weight of butterfat but not in excess of about 2.5% by weight, and the amount of tricalcium phosphate is 0.26% to 0.5%, the amount of said carrageenan is 0.03% to 0.04%, and the amount of guar gum is 0.02% to 0.03%.

33. The process of claim 31 wherein said milk contains at least 3.25% by weight of butterfat and the amount of tricalcium phosphate added is in the range of 0.26% to 1.0%, the amount of carrageenan is in the range of 0.03% to 0.04%, and the amount of guar gum is in the range of 0.02% to 0.03%.

34. A process for making a calcium-fortified and phophorus-fortified fresh low fat liquid milk providing about 500 mg–1000 mg of calcium per 8 ounce serving and containing about 2% by weight butterfat comprising the steps of
(1) forming a blend of dry, particulate, finely divided tricalcium phosphate, kappa carrageenan, and guar gum;
(2) adding said blended particulate material to a small amount of a 2% butterfat milk and mixing to form a premix, the mixing being continued for a sufficient period of time to permit the guar gum to hydrate;
(3) blending the said premix with the desired volume of said fresh milk such that the fortified liquid milk contains from 0.26% to 0.5% by weight of tricalcium phosphate, from 0.03% to 0.04% by weight of carrageenan, and from 0.02% to 0.03% by weight of guar gum, all percentages being based on the weight of the liquid milk;
(4) pasteurizing said blend and thereby causing said carrageenan to hydrate, and
(5) homogenizing, then packaging said fortified milk.

35. The process of claim 34 wherein the amount of said carrageenan is in the range 0.031%–0.039% and the amount of said guar gum is 0.023%–0.029%.

36. The process of claim 35 wherein the amount of said carrageenan is 0.035% and the amount of said guar gum is 0.0275%.

37. A process for making a calcium-fortified and phophorus-fortified liquid whole milk providing about 500 mg–1000 mg of calcium per 8 ounce serving and containing at least 3.25% by weight butterfat comprising the steps of
(1) forming a blend of dry, particulate, finely divided tricalcium phosphate, kappa carrageenan, and guar gum;
(2) adding said blended particulate material to a small amount of whole milk containing at least 3.25% by weight of butterfat, and mixing to form a premix, the mixing being continued for a sufficient period of time to permit the guar gum to hydrate;
(3) blending the said premix with the desired volume of said whole milk such that the fortified milk contains from 0.26% to 1.0% by weight of tricalcium phosphate, from 0.03% to 0.04% by weight of carrageenan, and from 0.02% to 0.03% by weight of guar gum, all percentages being based on the weight of the weight of the liquid milk;
(4) pasteurizing said blend and thereby causing said carrageenan to hydrate, and
(5) homogenizing, then packaging said fortified milk.

38. The process of claim 37 wherein the amount of said carrageenan is in the range 0.031%–0.039% and the amount of said guar gum is 0.23%–0.029%.

39. The process of claim 38 wherein the amount of said carrageenan is 0.035% and the amount of guar gum is 0.0275%.

* * * * *